(12) United States Patent
Hoff et al.

(10) Patent No.: US 9,970,347 B2
(45) Date of Patent: May 15, 2018

(54) COOLING SYSTEM HAVING PULSED FAN CONTROL

(71) Applicant: Caterpillar Inc., Peoria, IL (US)

(72) Inventors: Brian Douglas Hoff, East Peoria, IL (US); Ryan Robert Stoffel, Oswego, IL (US); Mark Edward Rettig, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days. days.

(21) Appl. No.: 15/372,960

(22) Filed: Dec. 8, 2016

(65) Prior Publication Data
US 2017/0089254 A1 Mar. 30, 2017

Related U.S. Application Data

(62) Division of application No. 14/453,695, filed on Aug. 7, 2014, now Pat. No. 9,551,275.

(51) Int. Cl.
*B60K 13/02* (2006.01)
*F02B 29/04* (2006.01)
*F01P 7/04* (2006.01)

(52) U.S. Cl.
CPC .......... *F02B 29/0493* (2013.01); *B60K 13/02* (2013.01); *F01P 7/044* (2013.01); *F02B 29/0431* (2013.01); *F02B 29/0456* (2013.01); *F02B 29/0475* (2013.01); *F01P 2060/02* (2013.01); *Y02T 10/146* (2013.01)

(58) Field of Classification Search
CPC .. F02B 29/0493; F02B 29/0475; F02B 29/04; F02B 29/0431; F02B 29/0456; B60K 13/00; B60K 13/02; F01P 7/044; F01P 7/00; F01P 7/04; F01P 7/046; F01P 7/048; F01P 7/026
See application file for complete search history.

(56) References Cited

U.S. PATENT DOCUMENTS

| | | | |
|---|---|---|---|
| 4,736,727 A | 4/1988 | Williams | |
| 4,779,577 A | 10/1988 | Ritter et al. | |
| 4,798,177 A * | 1/1989 | Oomura | F01P 7/044 123/41.02 |

(Continued)

FOREIGN PATENT DOCUMENTS

| | | |
|---|---|---|
| DE | 102007008240 A1 | 11/2007 |
| FR | 2756012 A1 | 5/1998 |

(Continued)

*Primary Examiner* — James M Dolak
(74) *Attorney, Agent, or Firm* — Finnegan, Henderson, Farabow, Garrett & Dunner, LLP

(57) ABSTRACT

A cooling system is provided for an engine. The cooling system may have an air cooler configured to cool intake air being supplied to the engine. The cooling system may also have a sensor configured to generate a temperature signal indicative of a temperature of the intake air and a fan in proximity to the air cooler. The cooling system may further have a controller in communication with the sensor and the fan. The controller may be configured to cause the fan to operate at a speed that is a function of the temperature signal when the temperature of the intake air is above a threshold temperature. The controller may further be configured to selectively cause the fan to pulse when the temperature of the intake air drops below the threshold temperature.

18 Claims, 3 Drawing Sheets

(56) References Cited

U.S. PATENT DOCUMENTS

| | | | | |
|---|---|---|---|---|
| 4,823,744 A * | 4/1989 | Omura | | F01P 7/044 |
| | | | | 123/41.12 |
| 4,977,743 A * | 12/1990 | Aihara | | F01P 7/026 |
| | | | | 123/41.31 |
| 5,284,202 A | 2/1994 | Dickey et al. | | |
| 5,359,969 A | 11/1994 | Dickrell et al. | | |
| 5,483,927 A * | 1/1996 | Letang | | B60K 31/045 |
| | | | | 123/322 |
| 5,531,190 A | 7/1996 | Mork | | |
| 5,598,705 A | 2/1997 | Uzkan | | |
| 6,045,482 A | 4/2000 | Nishar et al. | | |
| 6,076,488 A | 6/2000 | Yamagishi | | |
| 6,126,079 A | 10/2000 | Shoemaker | | |
| 6,178,928 B1 * | 1/2001 | Corriveau | | F01P 7/048 |
| | | | | 123/41.12 |
| 6,230,668 B1 | 5/2001 | Marsh et al. | | |
| 6,401,801 B1 | 6/2002 | Dicke | | |
| 6,408,831 B1 | 6/2002 | Craig et al. | | |
| 6,453,853 B1 | 9/2002 | Hawkins et al. | | |
| 6,463,891 B2 | 10/2002 | Algrain et al. | | |
| 6,571,751 B2 | 6/2003 | Vogt | | |
| 6,843,211 B2 | 1/2005 | Iwasaki | | |
| 7,310,959 B2 * | 12/2007 | Braun | | F01P 7/048 |
| | | | | 123/41.11 |
| 7,685,816 B2 * | 3/2010 | Yabuki | | F01P 7/044 |
| | | | | 60/456 |
| 7,874,154 B2 | 1/2011 | Raab et al. | | |
| 8,015,953 B2 | 9/2011 | Stramecki | | |
| 8,428,817 B2 * | 4/2013 | Yamaguchi | | B60H 1/004 |
| | | | | 62/228.1 |
| 8,429,911 B2 | 4/2013 | Back et al. | | |
| 8,646,264 B2 * | 2/2014 | Rampen | | F01P 7/044 |
| | | | | 60/329 |
| 8,667,931 B2 | 3/2014 | Kems | | |
| 8,677,884 B2 * | 3/2014 | Ogasawara | | F01P 5/04 |
| | | | | 91/1 |
| 8,825,285 B2 * | 9/2014 | Mougey | | F01P 7/048 |
| | | | | 123/41.05 |
| 8,826,893 B2 | 9/2014 | Marsh et al. | | |
| 9,022,647 B2 | 5/2015 | Jentz et al. | | |
| 9,097,191 B2 | 8/2015 | Yanakiev et al. | | |
| 9,228,466 B2 | 1/2016 | Greiner | | |
| 9,228,486 B2 | 1/2016 | Pursifull | | |
| 9,242,635 B2 | 1/2016 | Niimi | | |
| 9,267,432 B2 | 2/2016 | George et al. | | |
| 9,291,127 B2 | 3/2016 | Kovac et al. | | |
| 9,334,790 B2 | 5/2016 | Marceno et al. | | |
| 9,334,791 B2 | 5/2016 | Glugla et al. | | |
| 9,394,858 B2 | 7/2016 | Richards et al. | | |
| 9,551,275 B2 * | 1/2017 | Hoff | | F01P 7/044 |
| 9,828,902 B2 * | 11/2017 | Uto | | F01P 5/12 |
| 9,835,080 B2 * | 12/2017 | Bauer | | F02B 29/0475 |
| 2003/0056772 A1 * | 3/2003 | Borrmann | | F02B 29/0443 |
| | | | | 123/563 |
| 2008/0098998 A1 | 5/2008 | Dicke | | |
| 2009/0217655 A1 | 9/2009 | Yabuki | | |
| 2011/0112742 A1 | 5/2011 | Losano et al. | | |
| 2013/0255605 A1 | 10/2013 | Jentz et al. | | |
| 2015/0107539 A1 * | 4/2015 | Haegerstam | | F02M 35/10268 |
| | | | | 123/41.11 |

FOREIGN PATENT DOCUMENTS

| | | |
|---|---|---|
| JP | 2002195045 | 7/2002 |
| JP | 2003237360 | 8/2003 |
| WO | WO 2013/094794 A1 | 6/2013 |

* cited by examiner

COOLING SYSTEM HAVING PULSED FAN CONTROL

RELATED APPLICATIONS

This application is a divisional application of U.S. application Ser. No. 14/453,695, filed Aug. 7, 2014, the entire contents of which are expressly incorporated herein by reference.

BACKGROUND

Engine-driven machines, such as dozers, loaders, excavators, motor graders, and other types of heavy equipment typically include a cooling system that cools the associated engine below a threshold temperature. The cooling system consists of one or more air-to-air or liquid-to-air heat exchangers that chill, among other things, coolant circulated throughout the engine and/or intake air directed into the engine. Heat from the coolant or intake air is transferred to air by a fan that is speed controlled based on temperatures of one or more of the various systems being cooled (e.g., engine).

Many cooling system fans are hydraulically powered. Specifically, a fan circuit may include a pump driven by the engine of the machine to draw in low-pressure fluid and discharge the fluid at elevated pressures to a motor that is connected to the fan. When temperatures are higher than desired, the fan circuit increases the speed of the fan. When temperatures are low, the fan circuit decreases the speed of the fan. However, due to a minimum inlet pressure requirement of the motor, the fan often has a limit on the minimum speed. Therefore, in some situations, for example, in cold ambient conditions, even when operating at the minimum speed, the fan may provide more cooling than is required or desired. This excessive cooling can cause icing of the engine inlet manifold.

One control strategy of preventing over cooling of the engine is described in U.S. Pat. No. 6,453,853 (the '853 patent) issued to Hawkins et al. on Sep. 24, 2002. Specifically, the '853 patent describes a strategy for controlling a hydraulic cooling fan. The control strategy reduces the possibility of engine overcooling during cold weather operation by turning the fan completely off whenever engine compartment temperatures are within acceptable limits and there is no request for fan speed.

Although the system of the '853 patent may reduce the likelihood of engine over cooling, it may still be less than optimal. Specifically, because the system of the '853 patent turns the fan completely off for an extended period of time, there is a risk that thermal shock of system components may occur when the fan is turned back on. Another control strategy to allow operation at lower temperatures is to raise engine speed and add loads to the system, but doing so greatly reduces fuel economy of the engine.

The cooling system of the present disclosure is directed to overcoming one or more of the problems set forth above and/or other problems with existing technologies.

SUMMARY

In one aspect, the present disclosure is directed to a cooling system for an engine. The cooling system may include an air cooler configured to cool intake air being supplied to the engine and a sensor configured to generate a temperature signal indicative of a temperature of the intake air. The cooling system may also include a fan in proximity to the air cooler and a controller in communication with the sensor and the fan. The controller may be configured to cause the fan to operate at a speed that is a function of the temperature signal when the temperature of the intake air is above a threshold temperature. The controller may further be configured to selectively cause the fan to pulse on and off when the temperature of the intake air is below the threshold temperature.

In another aspect, the present disclosure is directed to a method of cooling an engine. The method may include directing combustion intake air through an air cooler to cool the combustion intake air and directing combustion intake air from the air cooler into the engine. The method may also include generating a temperature signal indicative of a temperature of the combustion intake air and driving a fan in proximity to the air cooler that is a function of the temperature signal when the temperature of the combustion intake air is above a threshold temperature. The method may further include selectively pulsing the fan on and off when the temperature of the combustion intake air is below the threshold temperature.

In another aspect, the present disclosure is a machine. The machine may include a chassis, an engine mounted to the chassis, and traction devices configured to support the chassis. The machine may also include an air cooler configured to cool intake air being supplied to the engine and a sensor configured to generate a temperature signal indicative of a temperature of the intake air. The machine may also include a fan in proximity to the air cooler and a controller in communication with the sensor, and the fan. The controller may be configured to cause the fan to operate at a speed that is a function of the temperature signal when the temperature of the intake air is above a threshold temperature. The controller may further be configured to selectively cause the fan to pulse on and off when the temperature of the intake air is below the threshold temperature.

DETAILED DESCRIPTION

Figure 1:
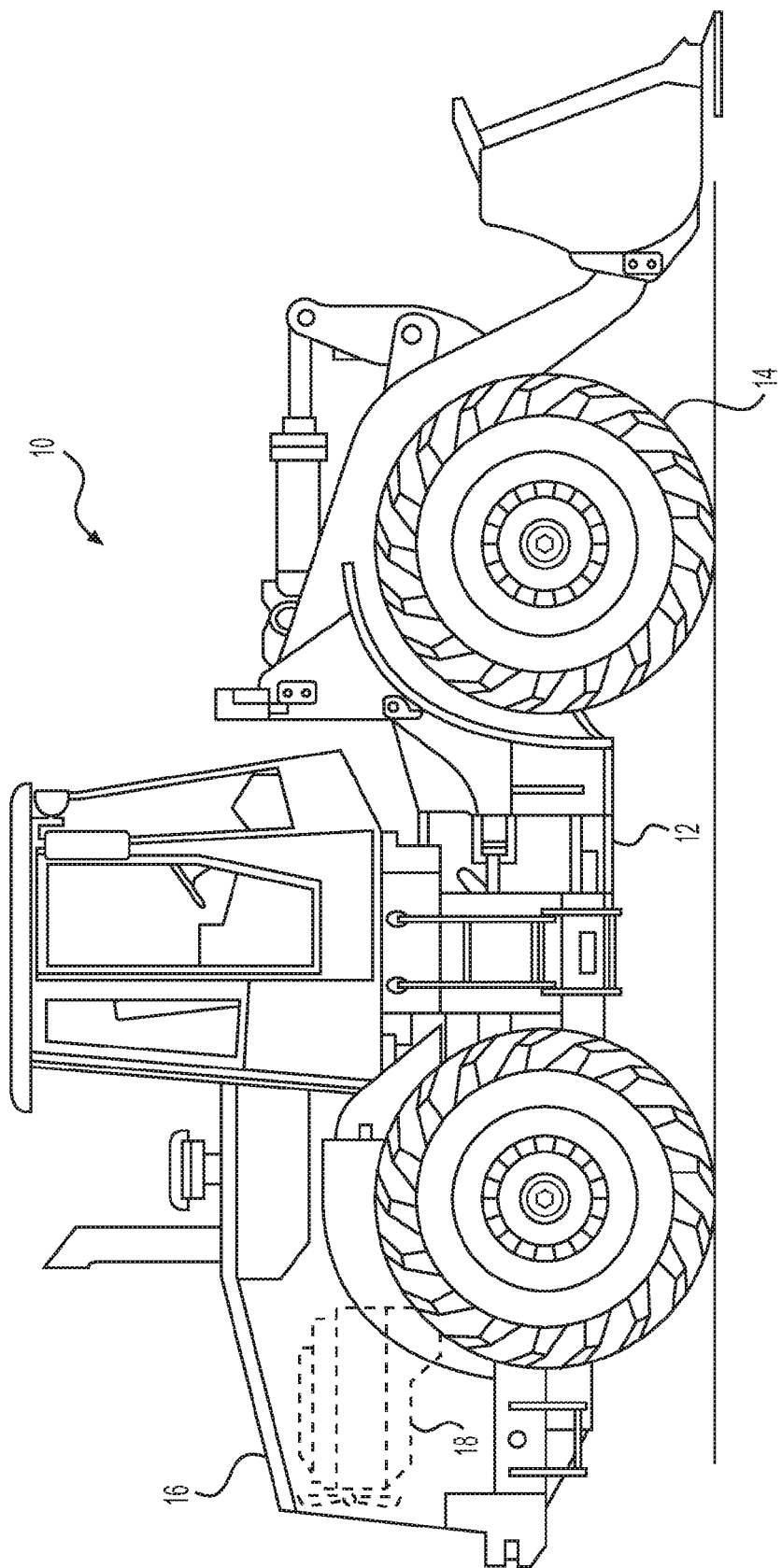
FIG. 1 is a side elevation illustration of an exemplary disclosed machine.

FIG. 1 illustrates an exemplary machine 10. In the depicted embodiment, machine 10 is a wheel loader. It is contemplated, however, that machine 10 may embody another type of machine such as an articulated haul truck, a motor grader, or any other machine or vehicle. It is also contemplated that machine 10 may find potential application in stationary systems, if desired, such as in power generation and/or fluid pumping systems. Machine 10 may include, among other things, a chassis 12 supported by traction devices 14 (e.g., wheels), an engine enclosure 16 mounted to chassis 12, and an engine 18 disposed within enclosure 16 and operable to traction device 14.

Figure 2:
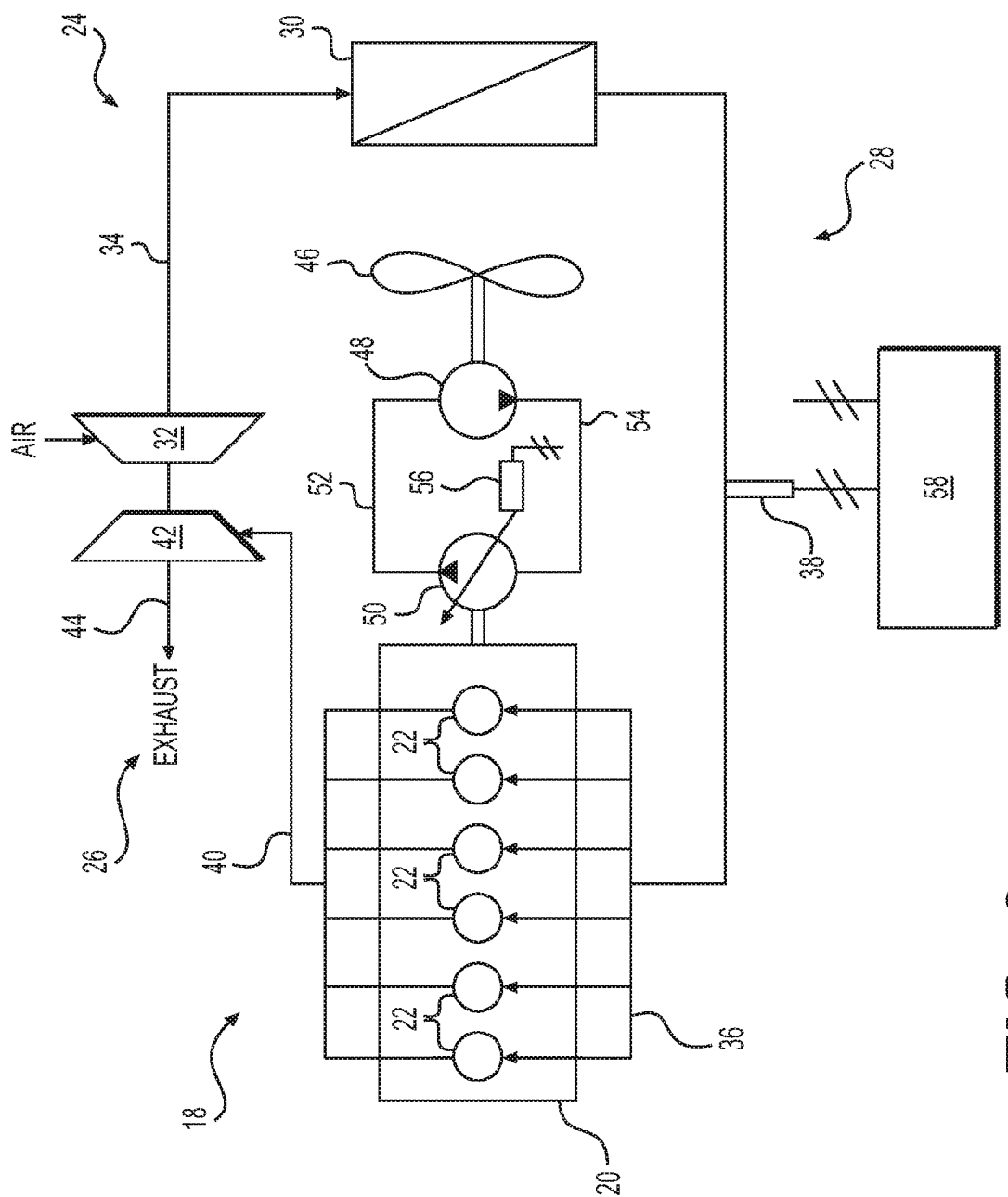
FIG. 2 is a schematic view of an exemplary disclosed cooling system for the machine of FIG. 1.

Engine 18 may be any type of combustion engine such as, for example, a two- or four-stroke diesel engine, a gasoline engine, or a gaseous fuel-power engine. As shown in FIG. 2, engine 18 may include an engine block 20 that at least partially defines a plurality of cylinders 22. A piston (not shown) may be slidably disposed within each cylinder 22 to reciprocate between a top-dead-center position and a bottom-dead-center position, and a cylinder head (now shown) may be associated with each cylinder 22. Each cylinder 22, piston, and cylinder head may together at least partially define a combustion chamber. In the illustrated embodiment, engine 18 includes six cylinders arranged in an inline configuration. However, it is contemplated that engine 18 may include a greater or lesser number of cylinders 22 and that cylinders 22 may be arranged in a V-configuration, in an opposing-piston configuration, or in another configuration, if desired As shown in FIG. 2, a plurality of different systems may cooperate to enhance operation of engine 18, including an air induction system 24, an exhaust system 26, and a cooling system 28. Air induction system 24 may be configured to direct intake air or a mixture of intake air and fuel into engine 18 for combustion. Intake air as used herein may also be referred to as combustion air or charge air. Exhaust system 26 may be configured to direct exhaust resulting from the combustion process to the atmosphere. Cooling system 28 may be configured to reduce temperatures of engine 18 (e.g., of coolant circulating through engine 18 and/or of the combustion intake air directed into engine 18) to help improve an efficiency of engine 18 and/or longevity of engine 18.

Air induction system 24 may include multiple components configured to condition and introduce compressed air into cylinders 22. For example, air induction system 24 may include an air cooler 30 (e.g., an air-to-air heat exchanger) located downstream of one or more compressors 32. Compressor(s) 32 may be connected to cooler 30 (e.g., via a passage 34), and configured to pressurize inlet air directed to cooler 30. After transferring heat to cooler 30 (e.g., to air passing through adjacent channels in cooler 30), the pressurized air from compressor(s) 32 may flow into cylinders 22 of engine 18 via an inlet manifold 36. It is contemplated that air induction system 24 may include different or additional components than described above such as, for example, a throttle valve, variable valve actuators associated with each cylinder 22, filtering components, compressor bypass components, and other known components that may be selectively controlled to affect an air-to-fuel ratio of engine 18, if desired.

In some embodiments, a sensor may be associated with air induction system 24. For example, a temperature sensor 38 may be disposed at a location upstream and/or downstream of the cooler 30 (e.g., within passage 34 and/or inlet manifold 36), and configured to generate a signal indicative of an intake air temperature. As will be explained in more detail below, the temperature signal from sensor 38 may be used to help control cooling system 28. For example, the signal may be used to control a flow rate of cooling air passing through the channels of cooler 30 described above. It is also contemplated that additional temperature sensors may be associated with air induction system 24, such that controlling a flow rate of cooling air passing through the channels of cooler 30 may be a function of one or more temperature sensors indicative of the temperature of different system components.

Exhaust system 26 may include multiple components that condition and direct exhaust from cylinders 22 to the atmosphere. For example, exhaust system 26 may include an exhaust passage 40 (e.g., an exhaust manifold), one or more turbines 42 driven by exhaust flowing through exhaust passage 40, and an exhaust stack 44 connected to an outlet of turbine(s) 42. It is contemplated that exhaust system 26 may include different or additional components than described above such as, for example, aftertreatment components, an exhaust compression or restriction brake, bypass components, an attenuation device, and other known components, if desired.

Cooling system 28 may include, among other things, a fan 46 situated proximate cooler 30 and engine 18. In the disclosed embodiment, fan 46 is hydraulically actuated to pull or push air through the channels of cooler 30 and across engine 18, thereby cooling the compressed intake air entering engine 18 and absorbing heat from external surfaces of engine 18. Specifically, a motor 48 may be connected to drive fan 46, and a pump 50 may be fluidly connected to motor 48 by way of a supply passage 52 and a return passage 54. Pump 50 may be, for example, a variable displacement pump powered by engine 18. Pump 50 may pressurize fluid (e.g., a dedicated hydraulic oil) and direct the pressurized fluid to motor 48 by way of supply passage 52. After passing through motor 48 and imparting mechanical rotation thereto, the fluid (now at a lower pressure) may be returned to pump 50 by way of return passage 54. It should be noted that, while the disclosed cooling system is shown as a closed-loop system, according to an exemplary embodiment, pump 50 could alternatively be connected to motor 48 via an open-loop that may incorporate a reservoir tank. Such an open-loop configuration can help regulate the temperature of the pressurized fluid and prevent overheating.

In the disclosed configuration, a displacement and rotational speed of pump 50, in conjunction with a displacement of motor 48 or position of a bypass valve (not shown), may determine a speed of fan 46. And the speed of fan 46 may directly relate to the flow rate of cooling air directed through cooler 30 and the corresponding temperature of the intake air directed into engine 18. Accordingly, the speed of fan 46 and the temperature of the intake air may be adjusted by selectively adjusting the displacement of pump 50 and/or the displacement of motor 48 or position of the bypass valve. In the disclosed embodiment, only pump 50 has variable displacement capability (i.e., only pump 50 has an adjustable displacement mechanism 56). However, it is contemplated that only motor 48 could alternatively have variable displacement capability or that both pump 50 and motor 48 could have variable displacement capability, if desired.

In one embodiment, motor 48 may have a minimum speed. The minimum speed may correspond with a minimum inlet pressure of motor 48. When the speed of motor 48 falls below this speed, the pressure at the inlet of motor 48 may be too low for efficient operation. That is, it may be possible for motor 48 to stop rotating, due to the inlet pressure being too low at below minimum motor 48 speed. In the disclosed embodiment, the minimum speed of motor 48 may be about 500 rpm.

A controller 58 may be associated with cooling system 28 and configured to regulate a speed of fan 46 based on the signal from sensor 38. For example, controller 58 may be in communication with the displacement mechanism 56 of pump 50 (and/or of motor 48, if so equipped). And based on a value of the signal, controller 58 may be configured to selectively adjust a displacement of pump 50, thereby adjusting the speed of fan 46. It is also contemplated that in other embodiments, controller 58 may be configured to selectively adjust a displacement of pump 50 based on the signal from sensor 38 and one or more additional temperature signals from sensors monitoring other components or fluids of machine 10.

Controller 58 may be a single microprocessor or multiple microprocessors that includes a mechanism for controlling an operation of cooling system 28. Numerous commercially available microprocessors can be configured to perform the functions of controller 58. It should be appreciated that controller 58 could readily be embodied in a general machine microprocessor capable of controlling numerous engine and/or machine functions. Controller 58 may include a memory, a secondary storage device, a processor, and any other components for running an application. Various other circuits may be associated with controller 58 such as power supply circuitry, signal conditioning circuitry, solenoid driver circuitry, and other types of circuitry.

Figure 3:
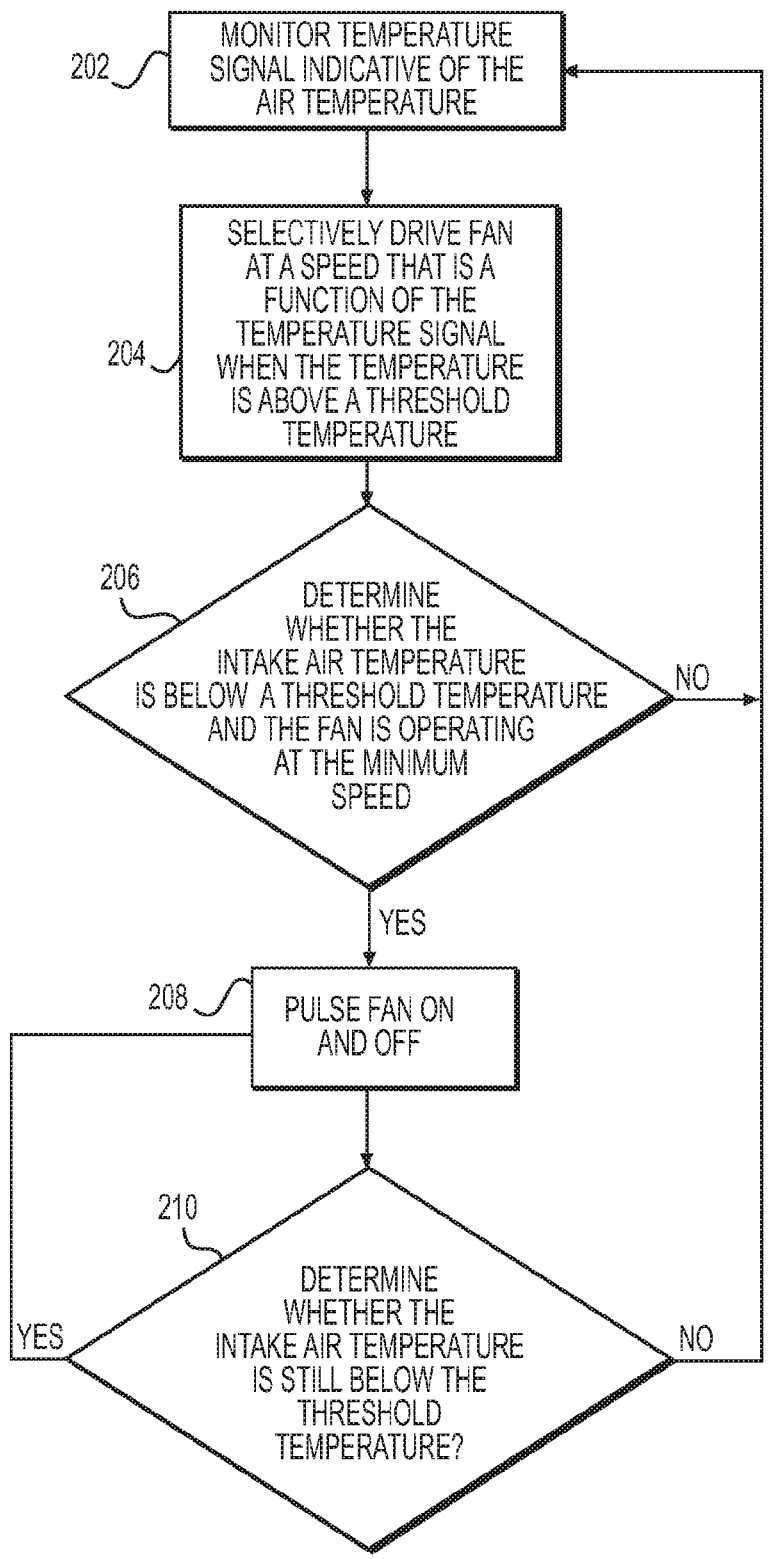
FIG. 3 is a flow chart illustrating an exemplary disclosed method of operating the cooling system of FIG. 2.

FIG. 3 illustrates an exemplary cooling system process implemented by controller 58. FIG. 3 will be discussed in more detail below to better illustrate the disclosed concepts.

INDUSTRIAL APPLICABILITY

The disclosed control system may be applicable to any machine that benefits from regulated cooling. The disclosed control system may help to keep system components at desired temperatures that promote efficient operation. The operation of cooling system 28 will now be explained with regard to FIG. 3.

During operation of machine 10, intake air may be drawn in by compressor 32, pressurized, and directed through passage 34 to cooler 30. As the intake air passes through channels in cooler 30, a flow of cooling air may be forced through adjacent channels by fan 46. As both flows of air pass through cooler 30, heat may be transferred from the intake air to the cooling air. The cool, compressed air may then be directed into engine 18, mixed with fuel, and combusted. Exhaust resulting from the combustion process may then be directed out of engine 18 via exhaust passage 40 and through turbine 42 where energy in the exhaust is recaptured and used to drive compressor 32.

During engine operation, controller 58 may continuously monitor a temperature of the intake air entering engine 18 to ensure that the air is at a desired temperature that promotes efficient operation (Step 202). In particular, the air should be sufficiently cool to increase its density and thereby allow a desired amount of intake air to be forced into cylinders 22 during each engine cycle, without being so cold that moisture in the air freezes within inlet manifold 36. A portion of the moisture in the air may be present in an exhaust gas recirculation (EGR) air stream that mixes with the intake air. If the moisture freezes inside inlet manifold 36, the flow of air into inlet manifold 36 may become restricted, resulting in unstable engine 18 operation. Accordingly, controller 58 may monitor the temperature of the intake air, and selectively drive fan 46 at a speed that is a function of the temperature signal (e.g., intake air temperature) when the temperature is above a threshold temperature (Step 204). Controller 58 may cause fan 46 to speed up or slow down based on a value of the signal. For example, as the temperature of the air increases, controller 58 may proportionally increase a displacement of pump 50, thereby increasing motor 48 speed and the speed of fan 46. Likewise, as the temperature of the air decreases, controller 58 may proportionally decrease the displacement of pump 50 or it may open a bypass valve to bypass pressurized fluid around motor 48.

The speed of motor 48 may only be decreased until the minimum motor speed is reached. As described above, the minimum motor speed in the disclosed example may be about 500 rpm. Accordingly, when the speed of motor 48 reaches the minimum motor speed, controller 58 may stop reducing the displacement of pump 50.

In some embodiments, fan 46 may still generate too much airflow when motor 48 has ramped to its minimum speed. Unless accounted for, overcooling of engine 18 could result, causing icing of inlet manifold 36 and unstable engine operation. For this reason, controller 58 may determine whether the temperature of the intake air is too low (e.g., below the threshold temperature) and fan 46 is operating at the minimum speed (e.g., pump 50 has been ramped down and is operating at its minimum displacement) (Step 206). As long as pump 50 remains above its minimum speed displacement or above the threshold temperature (Step 206: No), control may loop through steps 202-206.

However, when it is determined that the temperature of the intake air is below the threshold temperature and fan 46 is operating at the minimum speed (Step 206: Yes), controller 58 may be configured to selectively cause fan 46 to pulse on-and-off (Step 208). Controller 58 may cause fan 46 to pulse on-and-off by eliminating the torque input to fan 46 for a desired period of time, reapplying the torque input for a desired period of time, and again eliminating the torque input. In one embodiment, the off-period of time (i.e., the period of time during which motor 48 is not applying torque to fan 46) may be about equal to the on-period of time (i.e., the period of time during which motor 48 is applying torque). For example the on- and off-periods of time may be about equal to 5-60 seconds each. In another embodiment, the off-period of time is different than the on-period of time. The on- and/or off-periods of time may stay the same throughout engine operation regardless of temperature, or change based on the temperature, as desired. For example, as the temperature of the intake air reduces even further, the off-period of time may increase. And as the temperature of the intake air increases, the on-period of time may increase. In general, fan 46 may be caused to pulse at a rate that maintains the temperature of the intake air at a substantially constant value. In the disclosed example, the temperature may be maintained within about 5° C. of the threshold temperature.

There may be many different ways in which controller 58 could cause the pulsing of fan 46 (i.e., inhibit motor 48 from applying torque and cause motor 48 to apply torque). In one embodiment, controller 58 may inhibit motor 48 from applying torque by step-wise reducing the displacement of pump 50 to a neutral (i.e., zero angle) position. In another embodiment, pump 50 may be disconnected from engine 18 and/or from motor 48. In yet another embodiment, supply passage 52 may be connected directly to return passage 54 (e.g., utilizing a valve), such that pressurized fluid from pump 50 bypasses motor 48. Other methods may also be utilized, as desired.

After initiating pulsing of fan 46, controller 58 may continue to monitor the temperature of the intake air and compare the temperature to the threshold value (Step 210). As long as the intake air temperature remains below the threshold temperature (Step 210: Yes) after initiation of fan pulsing (Step 208), control may loop through steps 208-210. If the intake air temperature is not below the threshold temperature (Step 210: No), then controller 58 may return to step 202.

By causing fan 46 to pulse during extreme cold weather conditions, engine 18 may be inhibited from overcooling and components of cooling system 28 may not be exposed to damaging thermal shock. That is, the components (e.g., pump 50, motor 48, passages 52 and 54, fluid, etc.) of cooling system 28, by still being periodically operational, may remain at a substantially constant temperature that promotes longevity of the components. In particular, the components may not be allowed to cool off due to inactivity to a level that would cause thermal shock loading when operation is resumed. In addition to extending the life of these components, the operating range of machine 10 may also be improved. Specifically, machine 10 may be able to operate at even lower temperatures without increasing a risk of component failure due to thermal shock loading.

By preventing thermal shock and over cooling (e.g., icing of inlet manifold 36), the cold operating temperature performance (COTP) of machine 10 can be improved. For example, without pulsing the cold temperature idling capability of machine 10 may be about between about 0 and −10° C., because below that temperature, overcooling may become problematic. In contrast, by pulsing fan 46 as described herein the cold temperature idling capability of machine 10 may drop from to less than −40° C. Therefore, pulsing provides a larger temperature range in which machine 10 may operate while still preventing overcooling and thermal shock and it allows increased idling time without the need for refueling (i.e., increased fuel economy).

It will be apparent to those skilled in the art that various modifications and variations can be made to the disclosed cooling system. Other embodiments will be apparent to those skilled in the art from consideration of the specification and practice of the disclosed cooling system. For example, although the present disclosure is illustrated in the context of a cooling fan for intake air associated with an engine and other machine systems, the present disclosure may also be used in a similar manner to control coolant temperatures inside the engine. It is intended that the specification and examples be considered as exemplary only, with a true scope being indicated by the following claims and their equivalents.

What is claimed is:

1. A method of cooling an engine, the method comprising:
   directing combustion intake air through an air cooler to cool the combustion intake air;
   directing the combustion intake air from the air cooler into the engine;
   generating a temperature signal indicative of a temperature of the combustion intake air;
   driving a fan in proximity to the air cooler at a speed that is a function of the temperature signal when the temperature of the combustion intake air is above a threshold temperature; and
   selectively pulsing the fan on and off when the temperature of the combustion intake air is below the threshold temperature, wherein the fan is driven using a motor and the engine powers a pump to drive the motor, and wherein at least one of an on-period and an off-period of the motor and the pump vary in length based on the temperature of a fluid circulated between the motor and the pump.

2. The method of claim 1, wherein pulsing the fan on and off maintains the temperature of the combustion intake air entering the engine at a constant temperature.

3. The method of claim 2, wherein maintaining the temperature of the combustion intake air at a constant temperature includes maintaining the temperature of the combustion intake air within 5 degrees Celsius of the threshold temperature.

4. The method of claim 1, wherein pulsing the fan maintains the temperature of a fluid circulated between the motor and pump at a constant value.

5. The method of claim 1, wherein the threshold temperature corresponds to the minimum operating speed of the fan.

6. The method of claim 1, wherein the pulsing of the fan includes an on-period and an off-period, and
   wherein, during the on-period, the fan operates at a minimum speed.

7. The method of claim 1, wherein at least one of an on-duration and an off-duration of the fan vary in length based on the temperature of the combustion intake air.

8. The method of claim 1, wherein at least one of an on-duration and an off-duration of the fan are equal in length.

9. The method of claim 1, wherein at least one of an on-duration and an off-duration of the fan are between 5 and 60 seconds long.

10. The method of claim 1, wherein pulsing the fan on and off reduces cold temperature idling temperature for the engine to at least −40 degrees Celsius.

11. The method of claim 1, further including reducing on-periods of the fan when the temperature of the combustion intake air drops further below the threshold temperature.

12. The method of claim 1, further including increasing on-periods of the fan when the temperature of the combustion intake air approaches the threshold temperature.

13. The method of claim 1, wherein pulsing the fan on and off is caused by reducing the displacement of the pump to a neutral position.

14. The method of claim 1, wherein pulsing the fan on and off is caused by disconnecting the pump from the engine.

15. The method of claim 1, wherein pulsing the fan on and off is caused by bypassing the fluid around the motor.

16. The method of claim 5, wherein the minimum operating speed of the fan is 500 rotations per minute (rpm).

17. A method of cooling an engine, the method comprising:
    directing combustion intake air through an air cooler to cool the combustion intake air;
    directing the combustion intake air from the air cooler into the engine;
    generating a temperature signal indicative of a temperature of the combustion intake air;
    driving a fan associated with the air cooler at a speed that is a function of the temperature signal when the temperature of the combustion intake air is above a threshold temperature, wherein the fan is driven using a motor and the engine powers a pump to drive the motor, and wherein at least one of an on-period and an off-period of the motor and the pump vary in length based on the temperature of a fluid circulated between the motor and the pump.

18. The method of claim 17, further including maintaining the temperature of the combustion intake air entering the engine at a substantially constant temperature by pulsing the fan on and off.

* * * * *